United States Patent
Wolfe et al.

(10) Patent No.: US 11,823,043 B2
(45) Date of Patent: Nov. 21, 2023

(54) MACHINE LEARNING WITH INPUT DATA DOMAIN TRANSFORMATION

(71) Applicant: QUALCOMM Incorporated, San Diego, CA (US)

(72) Inventors: Jonathan Dewitt Wolfe, Austin, TX (US); Erich Plondke, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 671 days.

(21) Appl. No.: 16/688,602

(22) Filed: Nov. 19, 2019

(65) Prior Publication Data

US 2021/0150334 A1   May 20, 2021

(51) Int. Cl.
G06N 3/00 (2023.01)
G06N 3/08 (2023.01)
G06F 7/556 (2006.01)
G06F 17/14 (2006.01)
G06N 3/04 (2023.01)

(52) U.S. Cl.
CPC ............... *G06N 3/08* (2013.01); *G06F 7/556* (2013.01); *G06F 17/14* (2013.01); *G06N 3/04* (2013.01)

(58) Field of Classification Search
CPC .......... G06N 3/08; G06N 3/04; G06N 3/0454; G06N 3/063; G06N 3/084; G06F 7/556; G06F 17/14; G06F 7/4833
See application file for complete search history.

(56) References Cited

U.S. PATENT DOCUMENTS

| | | | | |
|---|---|---|---|---|
| 5,546,333 A | * | 8/1996 | Smith ................... | G06F 7/556 708/135 |
| 2004/0010532 A1 | * | 1/2004 | Lu ......................... | G06F 7/483 708/512 |
| 2019/0042922 A1 | * | 2/2019 | Pillai ..................... | G06F 17/17 |
| 2021/0133939 A1 | * | 5/2021 | Hanwell ............... | G06N 3/08 |

OTHER PUBLICATIONS

Wikipedia, Floating-point arithmetic (Year: 2022).*
Miyashita et al., Convolutional Neural Networks using Logarithmic Data Representation, arXiv:1603.01025v2 (Year: 2016).*
Wikipedia, Logarithm (Year: 2022).*
Hines, "A logarithmic neural network architecture for unbounded non-linear function approximation", Proceedings of International Conference on Neural Networks (ICNN'96) vol. 2, pp. 1245-1250 (Year: 1996).*

* cited by examiner

*Primary Examiner* — Ping Y Hsieh
*Assistant Examiner* — Xiao Liu
(74) *Attorney, Agent, or Firm* — QUALCOMM Incorporated (57) ABSTRACT

Aspects described herein provide a method of processing data in a machine learning model, including: receiving first domain input data; transforming the first domain input data to second domain input data via a domain transformation function; providing the second domain input data to a first layer of a machine learning model; processing the second domain input data in the first layer of the machine learning model according to a set of layer weights; and outputting second domain output data from the first layer of the machine learning model.

18 Claims, 8 Drawing Sheets

MACHINE LEARNING WITH INPUT DATA DOMAIN TRANSFORMATION

INTRODUCTION

Aspects of the present disclosure relate to machine learning models, and in particular to machine learning with input data domain transformation.

Machine learning may produce a trained model (e.g., an artificial neural network, a tree, or other structures), which represents a generalize fit to a set of training data that is known a priori. Applying the trained model to new data produces inferences, which may be used to gain insights into the new data. In some cases, applying the model to the new data is described as "running an inference" on the new data.

Machine learning models are seeing increased adoption across myriad domains. For example, machine learning models are being used to perform complex operations on electronic devices based on sensor data provided by one or more sensors onboard such devices, such as automatically detecting features within images.

Machine learning models are often designed around numerical representation intended to maximize the accuracy of the model. For example, machine learning models often use 32-bit floating point input data to train 32-bit floating point weights for 32-bit model computations. While 32-bit floating point representations have many beneficial qualities (e.g., dynamic range of representable values), mathematical operations with floating point data formats typically require more time to process and thus more processing power as compared to other formats, such as integer formats. Higher processing power requirements lead to the need for additional processing hardware in an electronic device, such as special floating point processing units, which in-turn means higher space and power requirements for the processing systems of the electronic device. Such requirements are especially disadvantageous for power sensitive applications, such as mobile electronic devices, edge computing devices, always-on sensing devices, internet of things (IoT) devices, and the like.

Further, sensors in electronic devices often output data in a different numerical representation format than the native format of the machine learning model in which the sensor data is going to be consumed. For example, mobile device sensors (e.g., cameras) may typically generate 12 to 14-bit integer sensor data (e.g., image data) that must be transformed into a different format (e.g., floating point) to work as training data or live inference data for a machine learning model trained on floating point data. Unfortunately, the data transformation may result in significant information loss between the original numerical representation format and the transformed numerical representation format, thus negatively impacting model performance.

Accordingly, what are needed are improved methods for training machine learning models with input data domain transformation.

BRIEF SUMMARY

In a first aspect, a method of processing data in a machine learning model, includes: receiving first domain input data; transforming the first domain input data to second domain input data via a domain transformation function; providing the second domain input data to a first layer of a machine learning model; processing the second domain input data in the first layer of the machine learning model according to a set of layer weights; and outputting second domain output data from the first layer of the machine learning model.

In a second aspect, a processing system, includes: a memory comprising computer-executable instructions; one or more processors configured to execute the computer-executable instructions and cause the processing system to: receive first domain input data; transform the first domain input data to second domain input data via a domain transformation function; provide the second domain input data to a first layer of a machine learning model; process the second domain input data in the first layer of the machine learning model according to a set of layer weights; and output second domain output data from the first layer of the machine learning model.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for machine learning with input data domain transformation. The input data domain transformation may change the input data domain into a data representation that is inherently faster to process while also scaling the input data to reduce model size and increase model speed. Beneficially then, the machine learning enhancements described herein result in smaller, faster, and more power efficient machine learning models, such as neural network models.

Brief Background on Neural Networks, Deep Neural Networks, and Deep Learning Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated) and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because it can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks, may be designed with a variety of connectivity patterns between layers.

Figures 1A, 1B, 1C:
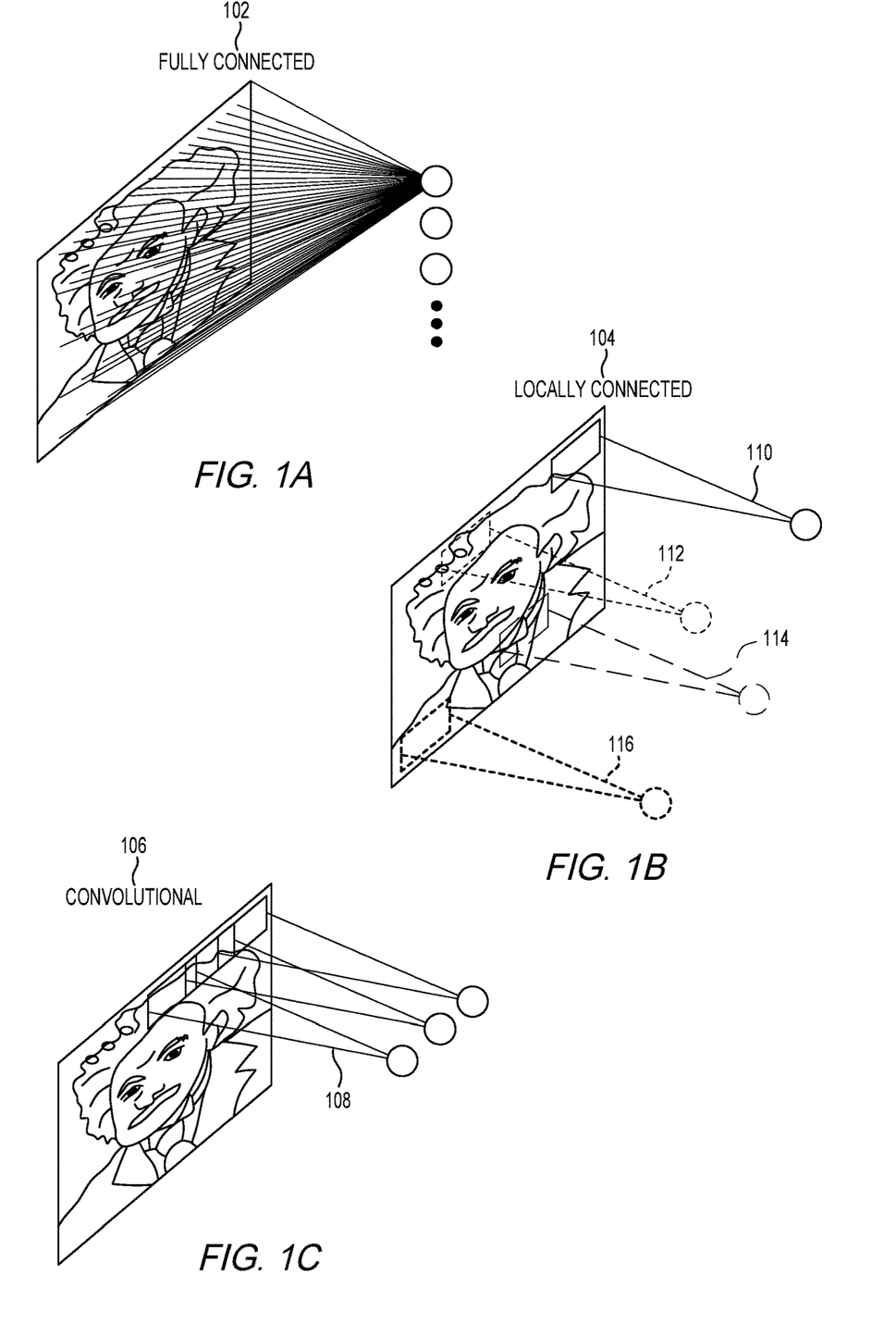
FIGS. 1A-1D depict examples of various types of neural networks.

FIG. 1A illustrates an example of a fully connected neural network 102. In a fully connected neural network 102, a node in a first layer communicate its output to every node in a second layer, so that each node in the second layer will receive input from every node in the first layer. Further, each set of nodes in the second layer in a fully connected network is obtained by multiplying the set of nodes in the previous layer with a matrix kernel. The contents of the matrix kernel are weights, which are learnt during neural network training.

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connections strengths (or weights) that may have different values (e.g., 110, 112, 114, and 116). The locally connected connectivity pattern may give rise to spatially distinct receptive fields in a higher layer, because the higher layer nodes in a given region may receive inputs that are tuned through training to the properties of a restricted portion of the total input to the network.

One type of locally connected neural network is a convolutional neural network. FIG. 1C illustrates an example of a convolutional neural network 106. Convolutional neural network 106 may be configured such that the connection strengths associated with the inputs for each node in the second layer are shared (e.g., 108). Convolutional neural networks are well-suited to problems in which the spatial location of inputs is meaningful.

One type of convolutional neural network is a deep convolutional network (DCN). Deep convolutional networks are networks of multiple convolutional layers, which may further be configured with, for example, pooling and normalization layers.

Figure 1D:
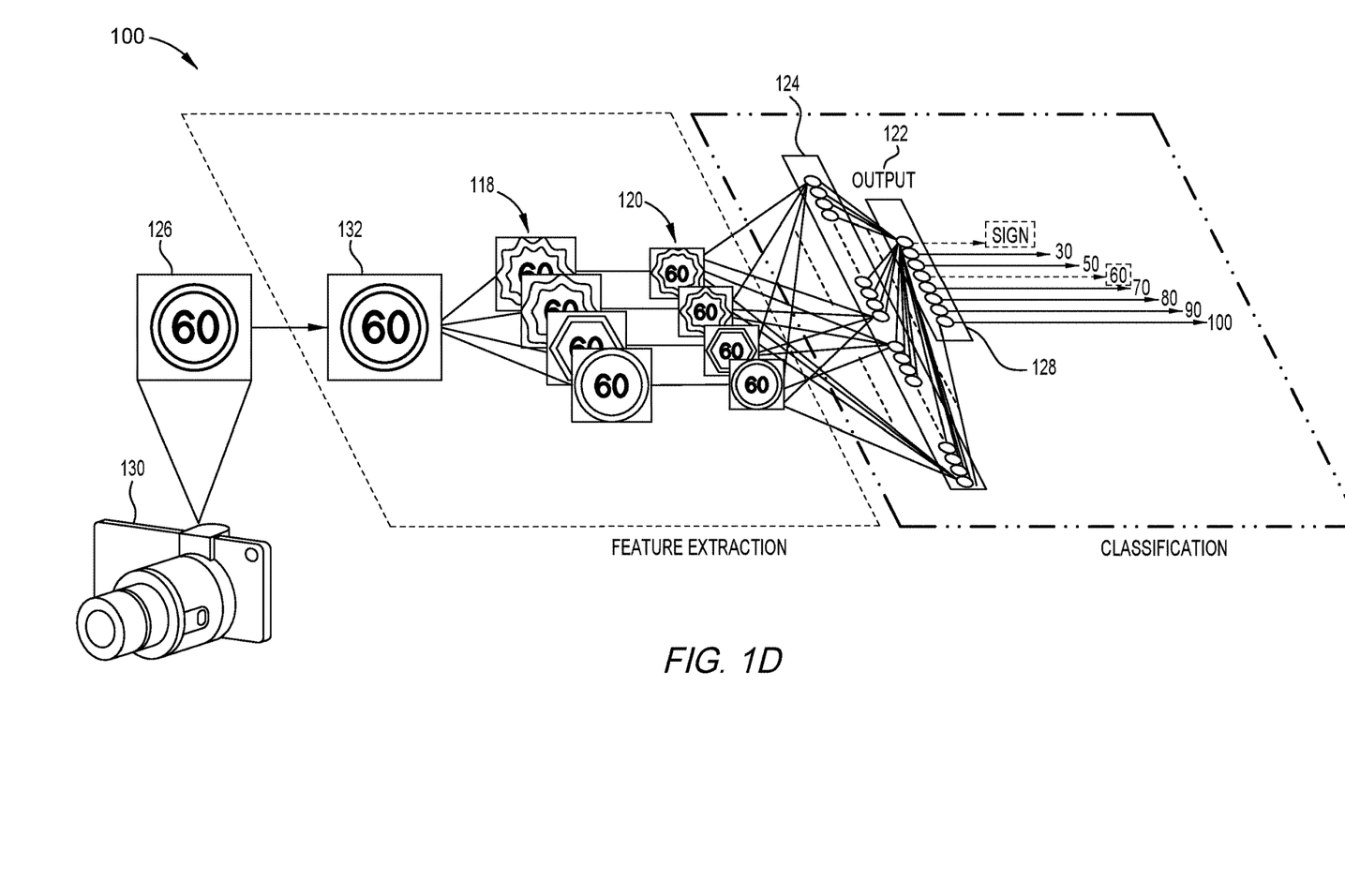

FIG. 1D illustrates an example of a DCN 100 designed to recognize visual features in an image 126 generated by an image capturing device 130. For example, if the image capturing device 130 was a camera mounted in a vehicle, then DCN 100 may be trained with various supervised learning techniques to identify a traffic sign and even a number on the traffic sign. DCN 100 may likewise be trained for other tasks, such as identifying lane markings or identifying traffic lights. These are just some example tasks, and many others are possible.

In this example, DCN 100 includes a feature extraction section and a classification section. Upon receiving the image 126, a convolutional layer 132 applies convolutional kernels to the image 126 to generate a first set of feature maps (or intermediate activations) 118. Generally, a kernel comprises a two-dimensional matrix of weights capable of emphasizing different aspects of an input data channel. In some cases, a three-dimensional structure comprising multiple kernels stacked together may also be referred to as a filter. In the present example, because four different feature maps are generated in the first set of feature maps 118, four different convolutional kernels are applied to the image 126 at the convolutional layer 132. Notably, this is just one example and many other configurations of kernels and filters are possible.

The first set of feature maps 118 may then be subsampled by a pooling layer (e.g., a max pooling layer, not shown) to generate a second set of feature maps 120. The pooling layer may reduce the size of the first set of feature maps 118 while maintain much of the information in order to improve model performance. For example, the second set of feature maps 120 may be down-sampled to 14×14 from 28×28 by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is reshaped to generate a first set of nodes 124 (e.g., in a fully connected layer). Furthermore, the first set of nodes 124 is further connected to a second set of nodes 128 (e.g., another fully connected layer). Each node in the second set of nodes 128 may include a number that corresponds to a possible feature of the image 126, such as "sign," "60," and "100."

A softmax function (not shown) may convert the numbers in the fourth feature map 128 into a probability in order that an output 122 of DCN 100 is one or more probabilities of the image 126 including one or more features, such as a sign with the numbers "60" on it, as in input image 126. Thus, in the present example, the probabilities in the output 122 for "sign" and "60" should be higher than the probabilities of the others of the output 122, such as "30," "40," "50," "70," "80," "90," and "100".

Before training DCN 100, the output 122 produced by DCN 100 may be incorrect. Thus, an error may be calculated between the output 122 and a target output known a priori. For example, here the target output is an indication that the image 126 includes a "sign" and the number "60". Utilizing the known, target output, the weights of DCN 100 may then be adjusted through training so that subsequent output 122 of DCN 100 achieves the target output.

To adjust the weights of DCN 100, a learning algorithm may compute a gradient vector for the weights. The gradient may indicate an amount that an error would increase or decrease if a weight were adjusted in a particular way. The weights may then be adjusted to reduce the error. This manner of adjusting the weights may be referred to as "back propagation" as it involves a "backward pass" through the layers of DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, DCN 100 may be presented with new images and DCN 100 may generate inferences, such as classifications, or probabilities of various features being in the new image.

Notably, the configuration of DCN 100 is just one example, and many other configurations are possible. For example, additional connections, such as skip connectors or recurrent connections, may be added in other examples. Further, the example application described with respect to FIG. 1D is just one possible application, and many other are possible.

Floating Point and Integer Numerical Representation Formats

Integer and floating point are two common numerical representation formats for computer processing.

Integers are commonly represented in a computer as a group of binary digits (bits). The size of the grouping varies so the set of integer sizes available varies between different types of computers. Generally, the number of representable values for an integer representation is $2^n$, where n is the number of bits. For signed integer formats, the dynamic range for an integer format is $[-2^{n-1} \ldots 2^{n-1}-1]$. So, for example, an 8-bit integer has a range of $[-128 \ldots 127]$ and a 4-bit integer has a range of $[-8 \ldots 7]$.

A floating point number is generally represented by a fixed number of significant digits (the significand) that is scaled using an exponent in some fixed base, such as base two, ten, or sixteen. The term floating point refers to the fact that a number's radix point (decimal point, or, more commonly in computers, binary point) can "float", i.e., it can be placed anywhere relative to the significant digits of the number. Because of this quality, a floating-point system can be used to represent a wide dynamic range of numbers, including numbers of different orders of magnitude. For example, the dynamic range of a 32-bit floating point number is $\pm 3.4 \times 10^{38}$ and approximately $4.2 \times 10^9$ values can be represented. Further, floating point provides the same relative accuracy at all magnitudes (limited only by the length of the significand) and allows calculations across magnitudes. Thus, floating point are a common choice for computer processors needing to deal with a wide range of values for computation.

Integer and floating-point values are generally handled differently by computer processing system owing to their distinct representation schemes. Consequently, the performance of a processing system varies between these different numerical representation types. Generally, floating point operations are slower than integer operations at the same data size. However, for both floating point and integer operations, smaller size (e.g., 16-bit versus 32-bit) is always faster to process.

Quantization in Machine Learning Models

Quantization is a process of mapping input values from a large set (often a continuous set) to output values in a smaller set, often with a finite number of elements. For example, quantization may be used to reduce the number of bits that represent a number.

The predominant numerical representation format for machine learning models (e.g., deep neural networks) is 32-bit floating point. As above, 32-bit floating is able to represent a wide range of distributions accurately, which is beneficial for machine learning models, especially where the distributions of weights and activations have very different value ranges. However, in order to broaden the application of machine learning models, e.g., by reducing bandwidth and compute requirements, it is desirable to use lower-precision numerical formats.

Quantization may be used in machine learning applications to perform lower-bit computations, which beneficially increases speed, reduces bandwidth, and reduces storage. For example, using 8-bit integers for weights and activations consumes approximately 4× less overall bandwidth compared to 32-bit floating point. Additionally, integer compute is generally faster than floating point compute as well as more area and energy efficient. As another example, an 8-bit integer addition operation may use approximately 30× less power and requires 115× less on-chip processing area than a 32-bit floating point equivalent. Similarly, an 8-bit integer multiplication operation may use approximately 19× less power and requires 27× less on-chip processing area compared to a 32-bit floating point equivalent. Such performance improvements allow real-time implementations of machine learning models on resources-limited hardware, such as mobile electronic devices, edge computing devices, always-on sensing devices, internet of things (IoT) devices, and the like.

However, aggressive quantization, such from 32-bit floating to 8-bit integer, often entails a significant penalty in terms of accuracy, and often requires time-consuming retraining of a machine learning model to work with the quantized values. Accordingly, quantization by itself has not proven a straightforward solution for reducing machine learning model processing requirements such that models can be more widely deployed.

Domain Transformation Pre-Processing for Neural Networks

Conventional quantization methods for machine learning models generally quantize input data along a linear scale.

Unfortunately, such quantization methods group all the small values at zero, which means significant information can be lost. For example, a dark image (e.g., taken in a low light environment) may have many pixels with small values, and conventional quantization may group and remove all of that information.

More generally, sensor data, which is often output as 12-14 bit integer data, has proven difficult to quantize down to, for example, 8-bit integer without significant information loss. The information loss may render any resulting model output significantly less useful.

In order to overcome limitations of conventional quantization methods, the methods described herein apply a domain transformation function to input data. In one embodiment, a logarithmic (or "log") scaling function is used. Beneficially, a log function produces a similar percentage error at any magnitude by definition. Further, because physical quantities measured by sensors are scale invariant, a log transformation can move small-scale information and large-scale information closer together, thus reducing information loss when scaling is applied. Thus, a log transformation can help maintain the original high dynamic range of sensor data while scaling the data to a smaller size based on a selectable log base.

Notably, human visual and auditory perception already logarithmically transform inputs, which suggests that such transforms will be very effective in similar domains, such as machine learning models for analyzing image and audio data.

In one example, a first node of a neural network, such as a deep neural network, transforms input X according to the domain transformation function $\log_b(X)$. The base b may be chosen to scale the original data size into a smaller data size. For example, 12-bit integer sensor data in a first data domain may be scaled into 8-bit sensor data in a second data domain, such as the log domain in this example. In some embodiments, the neural network may exponentiate the output of the model Y to $b^Y$ in order to restore the output data to the original data domain.

Notably, the transformation of input data from a first domain to a second domain via a domain transformation function can benefit resulting model performance in two distinct ways. First, the target domain of the transformation may be an inherently faster domain for processing, such as when transforming data from floating point to integer. Second, the transformation can include scaling (e.g., by a selectable log base) from a larger data size to a smaller data size, which improves speed and reduces size of the model. Further yet, because the domain transformation preserves more information as compared to conventional linear quantization, the resulting model will have better accuracy based on training data keeping more information after transformation (compared to linear quantization).

Further, after transforming input data to a more compact numerical representation, such as 8-bit integer, the rest of the neural network can also be transformed to use the compact numerical representation, such as by quantization of weights.

Further yet, domain transformation pre-processing of input data can facilitate and improve independent quantization of data, which allows for the benefits of conventional quantization without the conventional level of information loss. Thus, in some examples, the processing speed, efficiency, power use, and chip area use can all be further improved by combining input data domain transformation with additional quantization.

Figure 2:
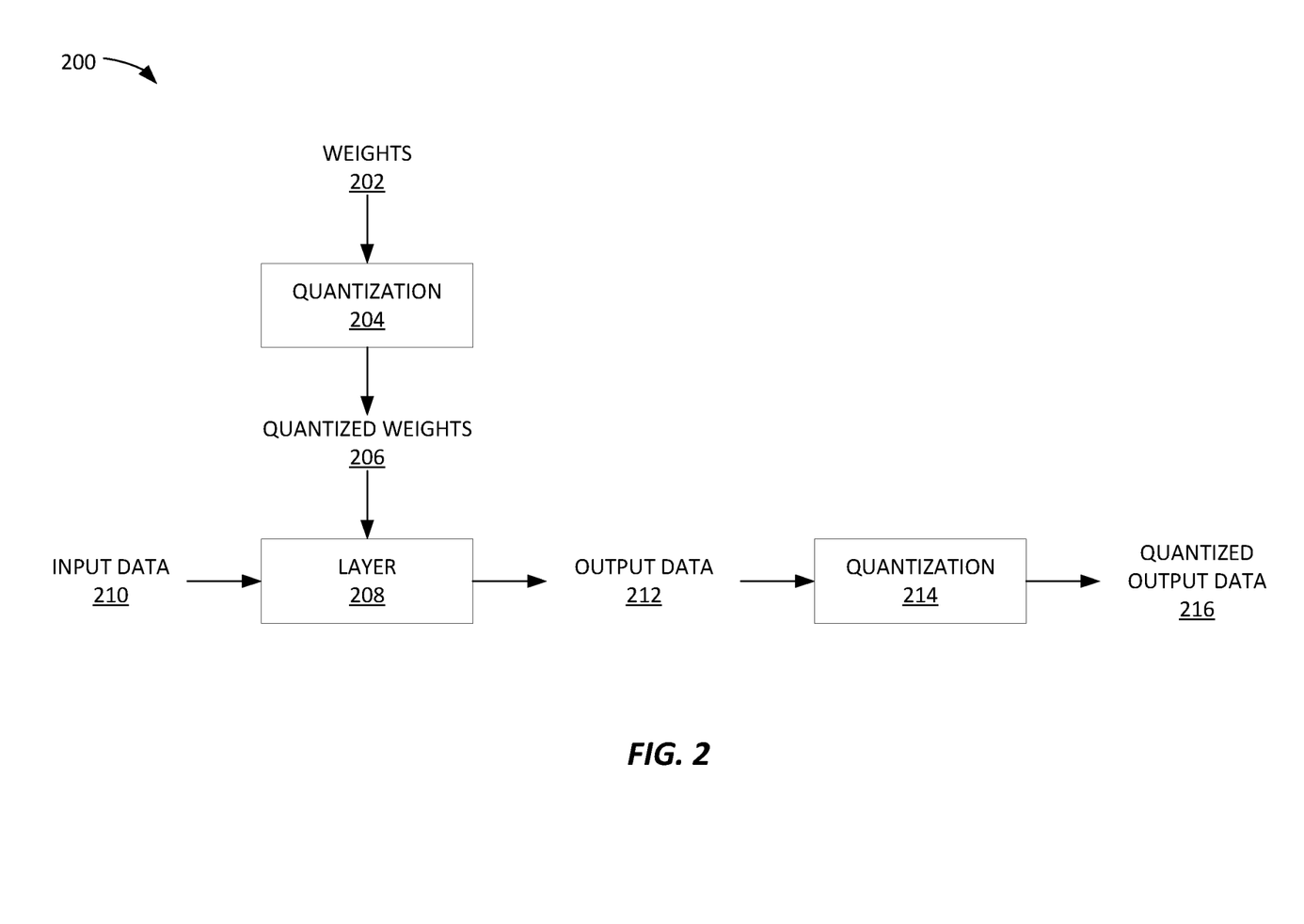
FIG. 2 depicts an example of a neural network layer with quantization of weights and activations.

FIG. 2 depicts an example 200 of a neural network layer with quantization of weights and activations.

In this example, the original weights 202 are passed through a quantization operation 204, which generates a set of quantized weights 206. The quantized weights are used for the processing of input data 210 in layer 208, which generates the output data 212 (e.g., activations). The output data 212 is further quantized to generate quantized output data 214 because the operations of layer 208 are performed at full precision and thus output full precision output data 212. Notably, the original weights 202 are maintained throughout the training process in order to accumulate small changes from the gradients without loss of precision. Once the layer (and model) is trained, the quantized weights 206 are used for inferencing.

Layer 208 may include many sorts of operations, such as convolution operations, which may include branch normalization, bias addition, and activation operations, fully-connected layer operations, and element-wise operations, to name a few examples.

Figure 3:
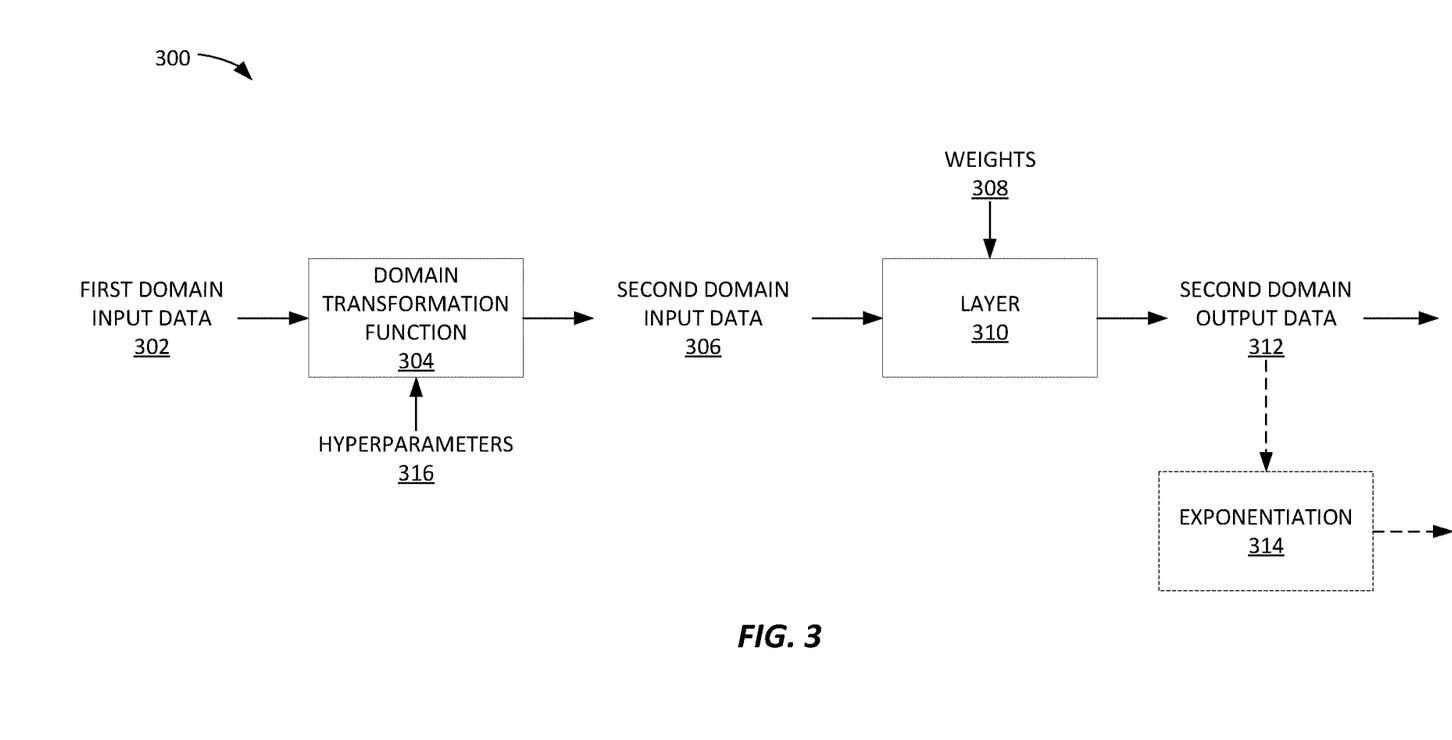
FIG. 3 depicts an example of a neural network with input data domain transformation and scaling.

FIG. 3 depicts an example 300 of a neural network with input data domain transformation and scaling.

First domain input data 302 is first pre-processed by a domain transformation function 304 to transform the data into second domain input data 306. For example, a logarithmic transformation function can transform first domain input data 302 (X) in a linear domain into second domain input data 306 in a log domain via operation $\log_b(X)$. In this example, b is a hyperparameter 316 representing the exponential base used for transformation via the domain transformation function 304. In some embodiments, m is an additional hyperparameter 316 for scaling the input range to ensure compatibility with the neural network architecture. For example, m may be used to scale the log transformed input to a range of values from 0 to m. In this example, scaling hyperparameter m may be determined based on the change of range introduced by base b.

For example, 14-bit integer sensor data may be scaled into a smaller data representation, such as 8-bit scaled integer data using b=65535 and m=255.

Some embodiments may perform the domain transformation (e.g., via domain transformation function 304) as an explicit layer early in a network. Other embodiments may perform the domain transformation before transmitting input data across a data bus, thus realizing additional power and bandwidth savings. For example, a data bus may exist between different processing elements, such as between a sensor (e.g., a camera sensor) and a digital signal processor. Yet other embodiments may integrate the domain transformation (e.g., domain transformation function 304) into the computations performed in the first layers of a neural network.

The transformation from first domain input data 302 to second domain input data 306 via domain transformation function 304 may perform two functions simultaneously. First, it may change the type of data representation, such as from floating point to integer. Second, it may scale the data from a first size to a second, smaller size. Thus domain transformation function 304 is an efficient operation for a neural network.

Second domain input data 306 is then processed by layer 310 using weights 308. In this embodiment, scaling of weights 308 is not necessary because training is required to correctly select the weights. More generally, the size of the inputs and the weights can be independent. In some embodiments, for example, the inputs and weights may be 8-bit integers, while in other embodiments the inputs and weights may be a mix of 8-bit or 16-bit integers. Further, the operations performed by layer 310 are performed at the scaled data size, which increases the speed of layer processing as compared to the original, unscaled input data size.

As above, layer 310 may include many sorts of operations, such as convolution operations, which may include branch normalization, bias addition, and activation operations, fully-connected layer operations, and element-wise operations, to name a few examples.

The output of layer 310 is second domain output data 312, which may be referred to as activations.

In some examples, second domain output data 312 may be optionally converted back to the first domain via exponentiation operation 314. For example, low-depth networks doing image-image or audio-audio transformation might benefit from exponentiation operation 314 by avoiding the network (e.g., an output layer of the network) having to learn the non-linear to linear domain mapping to produce the output 312. In other words, the exponentiation 314 may "help the network" by performing the transformation for free.

By training layer 310 using log transformed input training data (e.g., 302), higher fidelity is achievable with lower precision weights (e.g., 8-bit integer) operating on the training data. This results in a model that is smaller, faster, and more energy efficient.

Notably, FIG. 3 depicts a single layer (310) of a machine learning model for simplicity, but other layers may be present in the model. For example, second domain output data 312 may be input to another layer (not depicted) in the machine learning model.

Figure 4:
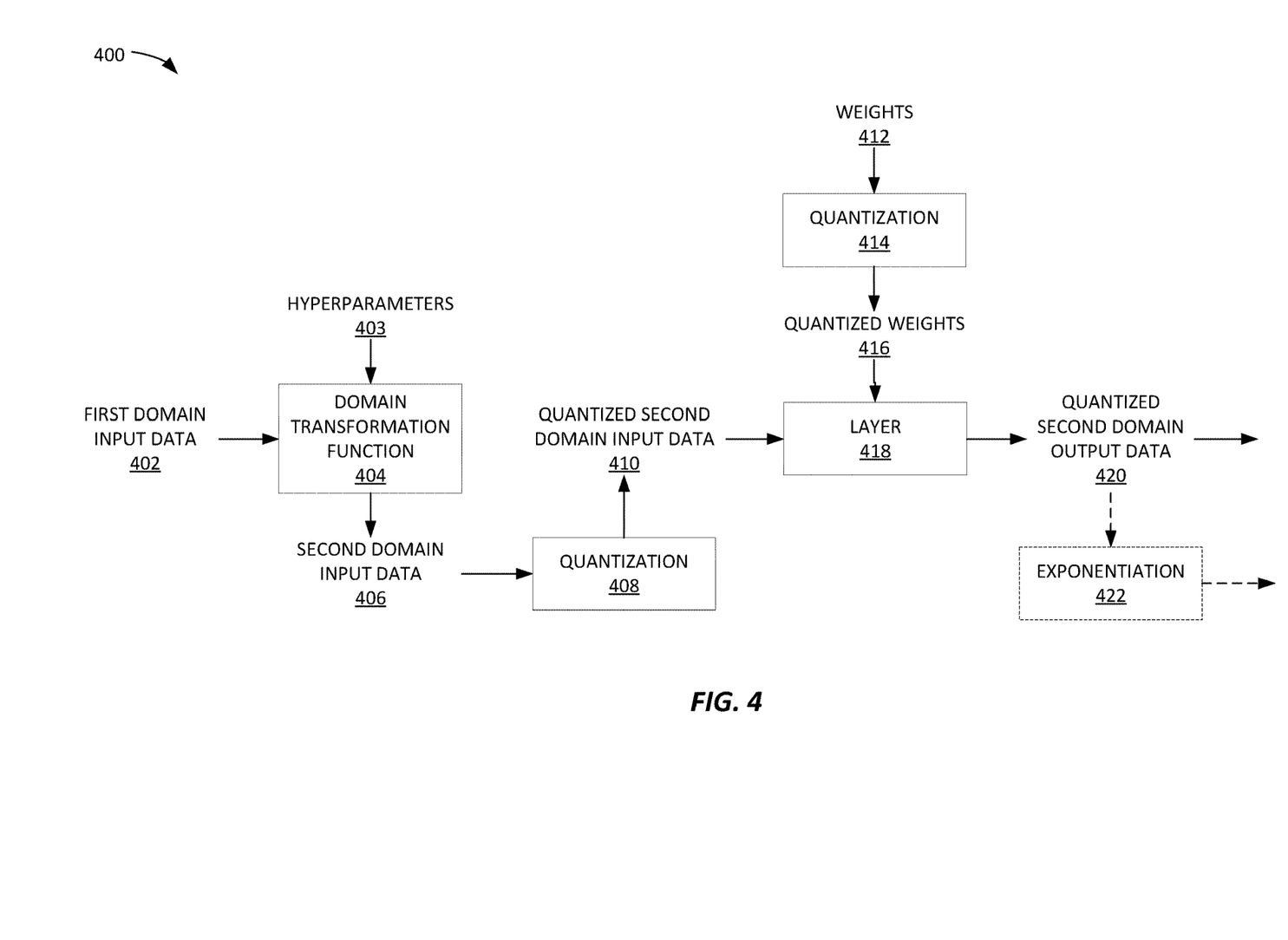
FIG. 4 depicts an example of a neural network with input data domain transformation and scaling as well as quantization.

FIG. 4 depicts an example 400 of a neural network with input data domain transformation and scaling as well as quantization.

As in FIG. 3, here first domain input data 402 is first pre-processed by a domain transformation function 404 to transform the data into second domain input data 406, such as via a logarithmic transformation function $\log_b(X)$, where b is a hyperparameter 403 chosen to determine the amount of scaling of the original data.

In this example, second domain input data 406 is then quantized by quantization operation 408, which may further reduce the size of second domain input data. In alternative embodiments, domain transformation function 404 and quantization operation 408 may be combined into a single function.

Quantized second domain input data 410 is then processed by layer 418 using quantized weights 416. As above, layer 418 may include any sort of neural network operation.

In this example, full precision weights 412 are quantized by quantization operation 414 to generate the quantized weights 416. However, the full precision weights 412 may be maintained during training to capture small gradients through back propagation during model optimization. In this embodiment, using quantized trained weights 416 with logarithmically transformed inputs allows the use of "cheap" multiply-accumulate operations, such as the use of 8-bit MACs for 8-bit quantized weights 416 and 8-bit transformed inputs 410. In other embodiments, the quantization 414 of weights 412 may be omitted.

The output of layer 418 is quantized second domain output data 420. In some examples, quantized second domain output data 420 may be optionally converted back to the first domain via exponentiation operation 422.

Thus in FIG. 4, like in FIG. 3, higher fidelity is achievable with lower precision weights, which results in a model that is smaller, faster, and more energy efficient. Further, here as in FIG. 3, a single layer (418) of a machine learning model is depicted for simplicity, but other layers may be present in the model.

Figure 5:
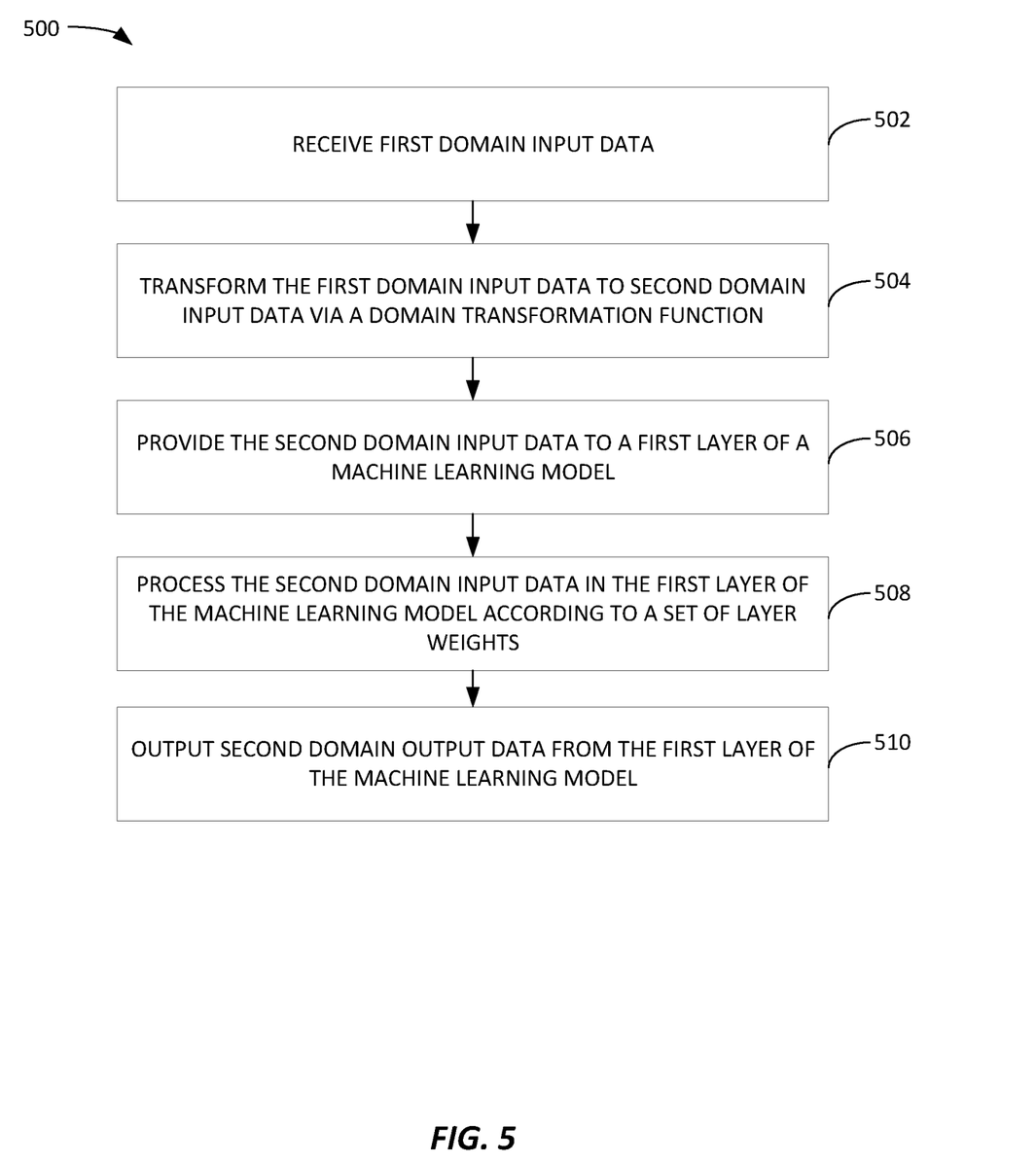
FIG. 5 depicts an example method of processing data in a machine learning model.

Example Method of Training a Neural Network with Input Data Domain Transformation FIG. 5 depicts an example method 500 of processing data in a machine learning model.

Method 500 begins at step 502 with receiving first domain input data.

Method 500 then proceeds to step 504 with transforming the first domain input data to second domain input data via a domain transformation function.

In some embodiments of method 500, the domain transformation function comprises a logarithmic transformation function.

Method 500 then proceeds to step 506 with providing the second domain input data to a first layer of a machine learning model.

Method 500 then proceeds to step 508 with processing the second domain input data in the first layer of the machine learning model according to a set of layer weights.

Method 500 then proceeds to step 510 with outputting second domain output data from the first layer of the machine learning model.

Some embodiments of method 500 further include determining one or more hyperparameter values for the domain transformation function. In some embodiments, determining the one or more hyperparameters comprises selecting predetermined hyperparameter values. In some embodiments, determining the one or more hyperparameter values comprises determining the one or more hyperparameter values during training of the machine learning model.

In some embodiments of method 500, the first domain input data comprises linear domain input data. In some embodiments of method 500, the second domain input data comprises log domain input data.

Some embodiments of method 500 further include exponentiating the second domain output data to form first domain output data.

Some embodiments of method 500 further include: providing the first domain output data to a second layer of the machine learning model.

Some embodiments of method 500 further include providing the second domain output data to a second layer of the machine learning model.

Some embodiments of method 500 further include quantizing the second domain input data to form quantized second domain input data, wherein the second domain output data comprises quantized second domain output data.

Some embodiments of method 500 further include quantizing the set of layer weights prior to processing the second domain input data in the first layer.

In some embodiments of method 500, the domain transformation function comprises $\log_b(X)$, X comprises the first domain input data, b comprises one of the one or more hyperparameters, and the value of b=65535. In some embodiments, m comprises one of the one or more hyperparameters, and the value of m=255.

Some embodiments of method 500 further include training the machine learning model based on the second domain output data.

Some embodiments of method 500 further include generating an inference based on the second domain output data.

In some embodiments, the machine learning model is a neural network model. In some embodiments, the neural network model is a convolutional neural network model.

Example Processing System

Figure 6:
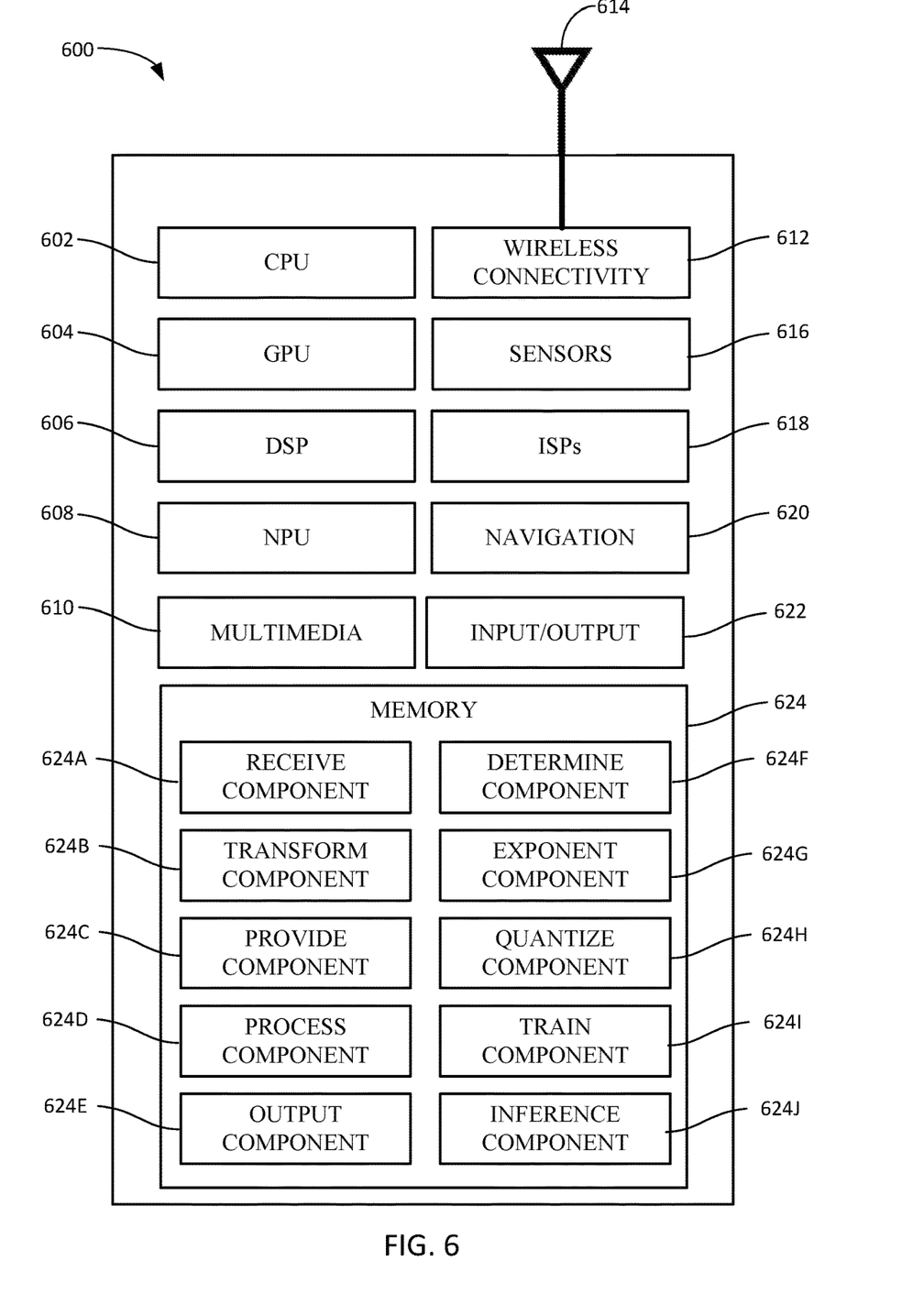
FIG. 6 illustrates an example electronic device, which may be configured to perform the methods described herein.

FIG. 6 illustrates an example electronic device 600. Electronic device 600 may be configured to perform the methods described herein, including with respect to FIG. 5.

Electronic device 600 includes a central processing unit (CPU) 602, which in some embodiments may be a multi-core CPU. Instructions executed at the CPU 602 may be loaded, for example, from a program memory associated with the CPU 602 or may be loaded from a memory block 624.

Electronic device 600 also includes additional processing blocks tailored to specific functions, such as a graphics processing unit (GPU) 604, a digital signal processor (DSP) 606, a neural processing unit (NPU) 608, a multimedia processing block 610, a multimedia processing unit 610, and a wireless connectivity block 612.

In one implementation, NPU 608 is a part of one or more of CPU 602, GPU 604, and/or DSP 606.

In some embodiments, wireless connectivity block 612 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 612 is further connected to one or more antennas 614.

Electronic device 600 may also include one or more sensor processors 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Electronic device 600 may also include one or more input and/or output devices 622, such as screens, touch-sensitive surfaces (including touch-sensitive displays), physical buttons, speakers, microphones, and the like.

In some embodiments, one or more of the processors of electronic device 600 may be based on an ARM or RISC-V instruction set.

Electronic device 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of electronic device 600. In particular, in this embodiment, memory 624 includes receive component 624A, transform component 624B, provide component 624C, process component 624D, output component 624E, determine component 624F, exponent component 624G, quantize component 624H, train component 624I, inference 624J. The depicted components, and others not depicted, may be configured to perform various aspects of the methods described herein.

Generally, electronic device 600 and/or components thereof may be configured to perform the methods described herein.

Figure 7:
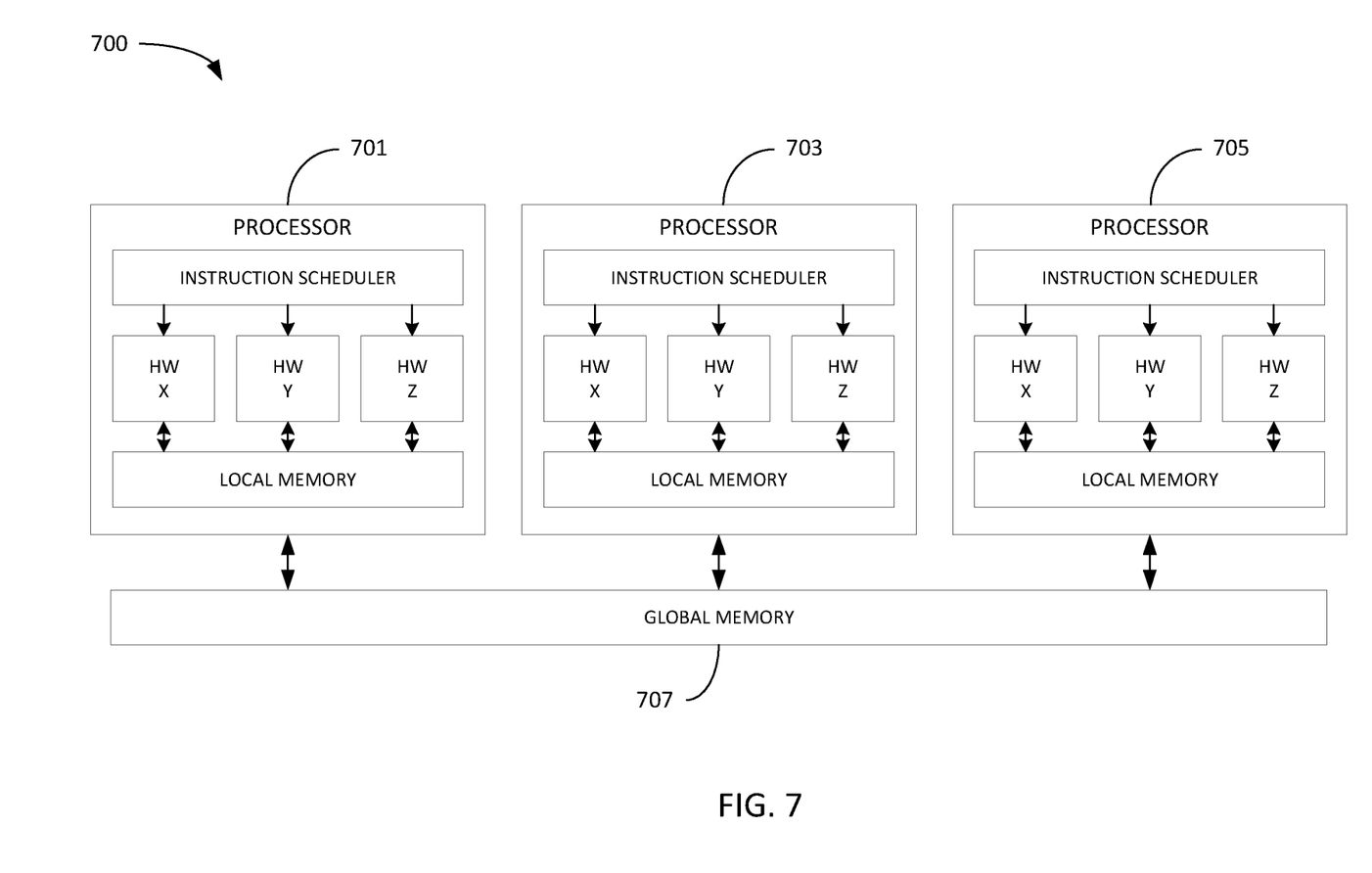
FIG. 7 depicts an example multi-processor processing system, which may be configured to perform the methods described herein.

FIG. 7 depicts an example multi-processor processing system 700 that may be implemented with embodiments described herein. For example, multi-processing system 700 may be representative of various processors of electronic device 600 of FIG. 6.

In this example, system 700 includes processors 701, 703, and 705, but in other examples, any number of individual processors may be used. Further, though depicted similarly, processors 701, 703, and 705 may be representative of various different kinds of processors in an electronic device, such as CPUs, GPUs, DSPs, NPUs, and the like as described herein.

Each of processors 701, 703, and 705 includes an instruction scheduler, various hardware sub-components (e.g., hardware X, hardware Y, and hardware Z), and a local memory. In some embodiments, the local memory may be a tightly coupled memory (TCM). Note that while the components of each of processors 701, 703, and 705 are shown as the same in this example, in other examples, some or each of the processors 701, 703, and 705 may have different hardware configurations, different hardware elements, etc.

Each of processors 701, 703, and 705 is also in data communication with a global memory, such as a DDR memory, or other types of volatile working memory. For example, global memory 707 may be representative of memory 624 of FIG. 6.

In some implementations, in a multi-processor processing system such as 700, one of the processors may act as a master processor. For example, processor 701 may be a master processor in this example. A master processor may include a compiler that, when executed, can determine how a model, such as a neural network, will be processed by various components of processing system 700. For example, hardware parallelism may be implemented by mapping portions of the processing of a model to various hardware (e.g., hardware X, hardware Y, and hardware Z) within a given processor (e.g., processor 701) as well as mapping portions of the processing of the model to other processors (e.g., processors 703 and 705) and their associated hardware. For example, the parallel blocks in the parallel block processing architectures described herein may be mapped to different portions of the various hardware in processors 701, 703, and 705.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of processing data in a machine learning model, comprising:
   receiving, from a sensor, first domain input data at a first module of a machine learning model, wherein the sensor is configured to use a different number representation format than at least a portion of the machine learning model is configured to use;
   transforming the first domain input data to second domain input data in the first module via a domain transformation function based on:
      a first selectable hyperparameter chosen based on a data size associated with the first module of the machine learning model, and
      a second selectable hyperparameter chosen based on a range associated with a first layer of the machine learning model;
   providing the second domain input data to the first layer of the machine learning model;
   processing the second domain input data in the first layer of the machine learning model according to a set of layer weights; and
   outputting second domain output data from the first layer of the machine learning model.

2. The method of claim 1, wherein the domain transformation function comprises a logarithmic transformation function.

3. The method of claim 1, wherein:
   the first domain input data comprises linear domain input data, and
   the second domain input data comprises log domain input data.

4. The method of claim 3, further comprising: exponentiating the second domain output data to form first domain output data.

5. The method of claim 1, further comprising: generating an inference based on the second domain output data.

6. The method of claim 1, further comprising: training the machine learning model based on the second domain output data.

7. The method of claim 1, further comprising:
   quantizing the second domain input data to form quantized second domain input data, wherein the second domain output data comprises quantized second domain output data.

8. The method of claim 7, further comprising:
   quantizing the set of layer weights prior to processing the second domain input data in the first layer.

9. The method of claim 1, wherein:
   the domain transformation function comprises $Log_b(X)$,
   X comprises the first domain input data,
   b corresponds to the first selectable hyperparameter, and
   an output of the domain transformation function is scaled to a range of values based on the second selectable hyperparameter.

10. A processing system, comprising:
    a memory comprising computer-executable instructions; and
    one or more processors configured to execute the computer-executable instructions and cause the processing system to:
       receive, from a sensor, first domain input data at a first module of a machine learning model, wherein the sensor is configured to use a different number representation format than at least a portion of the machine learning model is configured to use;
       transform the first domain input data to second domain input data in the first module via a domain transformation function based on:
          a first selectable hyperparameter chosen based on a data size associated with the first module of the machine learning model, and
          a second selectable hyperparameter chosen based on a range associated with a first layer of the machine learning model;
       provide the second domain input data to the first layer of the machine learning model;

process the second domain input data in the first layer of the machine learning model according to a set of layer weights; and output second domain output data from the first layer of the machine learning model.

11. The processing system of claim 10, wherein the domain transformation function comprises a logarithmic transformation function.

12. The processing system of claim 10, wherein:
the first domain input data comprises linear domain input data, and
the second domain input data comprises log domain input data.

13. The processing system of claim 12, wherein the one or more processors are further configured to cause the processing system to exponentiate the second domain output data to form first domain output data.

14. The processing system of claim 10, wherein the one or more processors are further configured to cause the processing system to generate an inference based on the second domain output data.

15. The processing system of claim 10, wherein the one or more processors are further configured to cause the processing system to train the machine learning model based on the second domain output data.

16. The processing system of claim 10, wherein the one or more processors are further configured to cause the processing system to quantize the second domain input data to form quantized second domain input data, wherein the second domain output data comprises quantized second domain output data.

17. The processing system of claim 16, wherein the one or more processors are further configured to cause the processing system to quantize the set of layer weights prior to processing the second domain input data in the first layer.

18. The processing system of claim 11, wherein:
the domain transformation function comprises $\text{Log}_b(X)$,
X comprises the first domain input data,
b corresponds to the first selectable hyperparameter chosen based on a data size associated with the first module of the machine learning model, and
an output of the domain transformation function is scaled to a range of values based on the second selectable hyperparameter.

* * * * *